United States Patent [19]
Labasque et al.

[11] Patent Number: 5,922,107
[45] Date of Patent: Jul. 13, 1999

[54] PROCESS FOR THE SEPARATION OF GAS MIXTURES CONTAINING OXYGEN AND NITROGEN

[75] Inventors: Jacques Labasque, Versailles; Serge Moreau, Velizy-Villacoublay; Dominique Rouge, Malakoff, all of France

[73] Assignee: L'Air Liquide, Societe Anonyme pour l'Etude et l'Explitation des Procedes Georges Claude, Paris Cedex, France

[21] Appl. No.: 08/925,475

[22] Filed: Sep. 8, 1997

Related U.S. Application Data

[30] Foreign Application Priority Data

Sep. 6, 1996 [FR] France ..................................... 9610905

[51] Int. Cl.$^6$ ................................................. B01D 53/047
[52] U.S. Cl. .................................. 95/96; 95/103; 95/117; 95/130
[58] Field of Search ........................ 95/96–98, 100–105, 95/130, 117–119

[56] References Cited

U.S. PATENT DOCUMENTS

| | | | |
|---|---|---|---|
| 4,684,377 | 8/1987 | Haruna et al. | 95/130 X |
| 4,859,217 | 8/1989 | Chao | 95/130 |
| 4,925,460 | 5/1990 | Coe et al. | 95/130 X |
| 5,114,440 | 5/1992 | Reiss | 95/130 X |
| 5,169,413 | 12/1992 | Leavitt | 95/130 X |
| 5,174,979 | 12/1992 | Chao et al. | 95/130 X |
| 5,203,887 | 4/1993 | Toussaint | 55/25 |
| 5,258,060 | 11/1993 | Gaffney et al. | 95/130 X |
| 5,266,102 | 11/1993 | Gaffney et al. | 95/130 X |
| 5,268,023 | 12/1993 | Kirner | 95/130 X |
| 5,464,467 | 11/1995 | Fitch et al. | 95/130 X |
| 5,529,610 | 6/1996 | Watson et al. | 95/100 |
| 5,658,370 | 8/1997 | Vigor et al. | 95/130 X |
| 5,672,195 | 9/1997 | Moreau et al. | 95/130 X |
| 5,674,311 | 10/1997 | Notaro et al. | 95/130 X |

FOREIGN PATENT DOCUMENTS

| | | | |
|---|---|---|---|
| 0192394 | 8/1986 | European Pat. Off. | 95/130 |
| 0 374 631 | 6/1990 | European Pat. Off. | |
| 62-148304 | 7/1987 | Japan . | |
| 63-004824 | 1/1988 | Japan . | |

*Primary Examiner*—Robert Spitzer
*Attorney, Agent, or Firm*—Young & Thompson

[57] ABSTRACT

A process for the separation of a gas mixture containing oxygen and nitrogen, including bringing the mixture into contact in an adsorption zone with a first selective adsorbent for nitrogen of faujasite type exchanged to at least 80% with lithium, in which the Si/Al ratio is lower than 1.5 and a second selective adsorbent for nitrogen of zeolite type exchanged with divalent cations such as the alkaline-earth metal or transition metal cations. The second adsorbent is characterized by a nitrogen adsorptivity $C_2$ lower than the nitrogen adsorptivity $C_1$ characterizing the first adsorbent, and an adsorption selectivity for nitrogen in relation to oxygen ($1\times10^5$ Pa, 20° C.) higher than or equal to 3.

21 Claims, 2 Drawing Sheets

PROCESS FOR THE SEPARATION OF GAS MIXTURES CONTAINING OXYGEN AND NITROGEN

FIELD OF THE INVENTION

The invention relates to a process of separation of a gas mixture containing oxygen and nitrogen, and more particularly to an improvement to the conventional pressure swing adsorption processes such as the PSA or VSA processes, optionally including a desorption step at subatmospheric pressure.

BACKGROUND OF THE INVENTION

The recovery of oxygen (or of oxygen-enriched gases) from gas mixtures containing oxygen and nitrogen, such as air, is of great interest where industry is concerned, since oxygen finds numerous applications in many fields, especially in the manufacture of steel, of glass or of paper, medicine, the welding of metals, combustion or decontamination.

Many separation processes involve bringing the gas mixture to be separated, containing nitrogen and oxygen into contact, in an adsorption zone, with a zeolitic adsorbent permitting a selective adsorption of nitrogen in the presence of oxygen, so as to recover an oxygen-enriched gas at the exit of the adsorption zone, followed by the regeneration of the zeolite by desorption of the nitrogen. During these various stages the temperature and pressure conditions are set so as to optimize the efficiency of the adsorption and of the desorption of nitrogen. It is well known that low temperatures promote adsorption, whereas elevated temperatures facilitate the nitrogen desorption processes.

Recent studies have shown that the use of lithium-exchanged zeolites, especially lithium-exchanged faujasites, as selective adsorbent for nitrogen, results in a clear improvement in the performance of the PSA or VSA processes for producing oxygen.

However, the high cost of manufacture of such zeolites has hitherto restricted their development. In fact, the lithium salts employed in the manufacture of zeolitic adsorbents are very expensive. The higher the degree of exchange to be reached, the more the quantity of lithium salts needed for carrying out the exchange increases. The exchange of adsorbent particles with lithium cations is therefore unavoidably reflected in an increase in the costs of production of the adsorbent particles and of the oxygen produced.

Thus, when it is desired to employ, in a PSA or VSA process, adsorbents of zeolite type exchanged with lithium to a degree of at least 80%, it is essential to take care not to increase the costs in an unacceptable manner.

A first solution consists in replacing a proportion of the lithium cations with other mono-, di- or trivalent cations. This is proposed in EP-A-0 667 183, which describes an air separation process using a zeolite X exchanged with 50 to 95% of lithium, 4 to 50% of aluminum, cerium or lanthanum and 0 to 15% of other ions. The fact of having to resort to at least two ion exchange stages during the manufacture of the zeolites cannot be considered satisfactory from the industrial and economic points of view. In addition, the performance of such adsorbents has not yet been demonstrated industrially and the ions, in the form of salts, employed for being replaced with lithium ions are also often even dearer than lithium ions.

A second solution consists in replacing a portion of the adsorbent bed of the lithium-exchanged zeolite type with an adsorbent of another type. This solution was adopted in U.S. Pat. No. 5,203,887, which describes an adsorption zone including two adsorbent beds arranged in series; the first consisting of a zeolite X exchanged to at least 80% with lithium, the second consisting of an unexchanged conventional zeolite X. However, the performance obtained by virtue of the use of this additional bed of adsorbent of unexchanged zeolite type is mediocre and much lower, insofar as the process yield and output efficiency are concerned, than those obtained by means of a single bed consisting solely of lithium-exchanged zeolites.

In the prior art there is therefore an existing need for a process, of PSA or VSA type, which would make it possible to obtain yield and output efficiency performances which are at least equivalent, or even superior, to those obtained in the case of sieves comprising only adsorbent particles of zeolite type exchanged with lithium in ratios of at least 80%, or even 90 or 95%, and which would be less of a burden from the viewpoint of costs.

SUMMARY OF THE INVENTION

Applicants have now surprisingly discovered that by combining a first bed of a zeolite of type X, or faujasite, exchanged to at least 80% with lithium, with a second bed of a zeolite exchanged with divalent cations, an improved adsorption zone is obtained which can be employed in the processes of separation of gas mixtures containing nitrogen and oxygen, the cost price of which is reduced in comparison with the adsorption zones of the state of the art, consisting exclusively of lithium-exchanged zeolites.

The present invention thus proposes a process of separation of gas mixtures containing nitrogen and oxygen employing, as adsorption zone, the combination of a bed consisting of faujasite exchanged to at least 80% with lithium with a bed consisting of a zeolite exchanged with divalent cations. The performance of the process of the invention has been found to be superior to those of the corresponding processes employing a zeolite containing lithium as sole adsorbent, at an equivalent total quantity by volume of adsorbent. In other words, the fact of employing a second bed consisting of a zeolite exchanged with divalent cations makes it possible not only to reduce the size of the bed consisting of lithium-exchanged zeolites, but also to obtain yield and output efficiency performances which are superior in comparison with the processes making use of one bed only consisting of particles of adsorbent of zeolite type with a high lithium exchange ratio, that is to say with an exchange ratio higher than 95% and tending towards 100%; which is not at all obvious in the light of the prior art. This superiority of the process of the invention over the conventional processes will be illustrated below with the aid of examples.

More precisely, the invention relates to a process for the separation of a gas mixture containing oxygen and nitrogen, including bringing the mixture to be separated into contact in an adsorption zone with, in any order, a first selective adsorbent for nitrogen, the first adsorbent being a zeolite of faujasite type exchanged to at least 80% with lithium, in which the Si/Al ratio is lower than 1.5, and a second selective adsorbent for nitrogen, the second adsorbent being an exchanged zeolite including divalent cations chosen from the group consisting of the alkaline-earth metal cations and of the transition metal cations, the second adsorbent being characterized by:

a nitrogen adsorptivity $C_2$ lower than the nitrogen adsorptivity $C_1$ characterizing the first adsorbent; and an adsorption selectivity for nitrogen in relation to oxygen at $1 \times 10^5$ Pa and at 20° C. higher than or equal to 3.

According to the invention the volume ratio of oxygen to nitrogen in the mixture to be separated may vary in any manner. The process of the invention can, for example, be employed for the separation of oxygen and of nitrogen which are present in air.

When the mixture to be separated, containing nitrogen and oxygen, also includes one or several other impurities, such as water vapour, this or these impurities can be removed by means of a bed of particles which is placed upstream of the adsorbent beds of zeolitic type; the choice of the particles intended to remove the impurity or impurities being made by a person skilled in the art as a function of the impurity or impurities to be removed. In order to remove water vapour, for example, alumina particles placed at the entry of the adsorption zone are chosen, so as to perform the subsequent separation of the oxygen and of the nitrogen on a dry gas mixture.

Roughly speaking, the zeolite crystals consist of networks of interlinked $SiO_4$ and $AlO_4$ tetrahedra in which are trapped cations ensuring the electrical neutrality of the zeolite, for example alkali or alkaline-earth metal cations such as sodium, potassium, calcium or magnesium.

In accordance with the invention the first and second adsorbents are exchanged zeolites; when the crystal network contains $Na^+$ cations as the only cations, the zeolite is said to be unexchanged. Conversely, when the zeolite includes other metal cations besides sodium, such as $Li^+$, alkaline-earth metal cations or transition metal cations, then the zeolite is said to be exchanged. In fact, zeolites are generally first synthesized in $Na^+$ form and later undergo one or more stages of cation exchange, that is to say the introduction of cations into the crystal network, such as the $Li^+$, $Ca^{2+}$, $Sr^{2+}$, $Ba^{2+}$ or $Mg^{2+}$ cations, the cations replacing $Na^+$ cations.

The ratio or degree of exchange of a zeolite is therefore a measurement of the quantity of cations introduced, other than $Na^+$.

In the case of zeolites exchanged with lithium, the degree of exchange represents the percentage of $AlO_{2\_}$ units of the zeolite which are associated with lithium cations. The expression zeolite exchanged to at least 80% with lithium thus refers to a zeolite in which at least 80% of the $AlO_2$ units are associated with $Li^+$ cations and not more than 20% are associated with $Na^+$ cations.

In the same way, in the case of zeolites exchanged with divalent cations the exchange ratio represents the percentage of $AlO_2$ units of the zeolite which are associated with divalent cations.

According to the invention the first adsorbent is a faujasite, that is to say a zeolite of type X, exchanged to at least 80% with lithium. The faujasite is preferably exchanged to at least 86% with lithium, better still to at least 90% with lithium.

The following operating procedure can be employed for the preparation of a lithium faujasite, starting with a crystalline zeolite of faujasite type. An aqueous solution of lithium salts, such as an aqueous solution of lithium chloride, the pH of which is adjusted between 8 and 10 by addition of lithium hydroxide, is percolated through a column packed with faujasite, maintained at a temperature of between 70 and 95° C. This operation is continued for as long as necessary to permit the exchange of at least 80% of the cations in the zeolite. It is generally estimated that, in order to introduce a given quantity of lithium ions into the zeolite, the column must be eluted with 1.2 to 12 times this quantity of lithium ions. The volume of the solution of lithium salts which must be poured into the top of the column can thus be easily determined by taking into account the normality of the solution. An aqueous solution of lithium chloride the normality of which is between 0.5 and 1.5 N, preferably 1 N, will preferably be employed. The temperature of the zeolite and that of the lithium chloride solution will advantageously be maintained at 95° C. throughout the duration of the ion exchange.

This procedure is proposed merely by way of illustration and without any limitation being implied; any other known process of the state of the art which makes it possible to end in a zeolite of faujasite type exchanged with lithium can be used.

It will be noted that, depending on the volume and the composition of the aqueous solution of lithium chloride eluted through the column, the degree of exchange can be adjusted.

Within the scope of the invention the use, as first adsorbent, of a faujasite exchanged to at least 80% with lithium, into which di- or trivalent cations, such as alkaline-earth metal cations or transition metal cations may have been introduced is not excluded, as long as the percentage of $AlO_{2\_}$ units associated with $Li^+$ cations in the resulting faujasite remains at least equal to 80%.

The second adsorbent used in the process of the invention is an exchanged zeolite whose crystalline structure is not critical. In other words, the second adsorbent may be derived from a zeolite of type X or A or from any other type of zeolite, this being immaterial. However, use of a zeolite X or A is preferred.

The Si/Al ratio of the second adsorbent is preferably between 1 and 3.

The essential characteristics of this zeolite are the following:

(i)—its crystal network includes divalent cations chosen from the group consisting of alkaline-earth metal cations and transition metal cations;

(ii)—its nitrogen adsorptivity $C_2$ is lower than the nitrogen adsorptivity $C_1$ characterizing the faujasite exchanged to at least 80% with lithium; and (iii)—its adsorption selectivity for nitrogen in relation to oxygen at a pressure of $1 \times 10^5$ Pa and at 20° C. is higher than or equal to 3.

The second adsorbent is preferably a zeolite including divalent cations of alkaline-earth metals, such as the $Ca^{2+}$, $Mg^{2+}$, $Ba^{2+}$ and $Sr^{2+}$ cations; $Ca^{2+}$ cations are preferred. A zeolite 10X exchanged with calcium or a zeolite 5A exchanged with calcium will thus advantageously be selected. For economic reasons it is preferred that the second adsorbent should be free from $Li^+$ cations.

With the condition (ii) being posed, it is preferred that the nitrogen adsorptivity $C_2$ characterizing the second adsorbent ($1 \times 10^5$ Pa, 20° C.) should be higher than 12 $cm^3/g$, better still higher than 14 $cm^3/g$.

The adsorption selectivity for nitrogen in relation to oxygen is the ratio of the nitrogen adsorptivity to the oxygen adsorptivity; these two adsorptivities being measured at a pressure of $1 \times 10^5$ Pa and at 20° C.

Thus, to be operational, the second adsorbent exhibits a relatively high selectivity for nitrogen and, in any event, higher than 3, a minimum value of 3.2 being desirable.

It is desirable, furthermore, that the second adsorbent should, in addition, be characterized by a value of the parameter $ak_2$ higher than that of the parameter $ak_1$, the parameters $ak_2$ and $ak_1$ characterizing the nitrogen adsorption kinetics of the first and second adsorbents respectively, in accordance with the Linear Driving Force model defined below.

Various works define the kinetic parameter ak, involved in the modelling of adsorption processes and more particularly in the Linear Driving Force model. Reference may be made especially to "Principles of adsorption and adsorption processes" John Wiley & Sons, 1984, p. 242–243 by D. M. Ruthven, or else "Pressure Swing Adsorption", VCS Publishers, 1994, p. 58–61, or else "Gas separation by adsorption processes", Yang Butterworth Publishers, 1987, p. 132–134.

The determination of the value of the parameter $a_k$ can be carried out in a manner which is simple and known to a person skilled in the art, from a breakthrough curve of an oxygen/nitrogen mixture.

When the adsorptivity of the zeolite increases linearly as a function of the pressure to which the adsorption zone, and hence the adsorbent, is subjected, it can be shown that the parameter ak satisfies the following equation:

$$a_k = 2 \times \mu / \sigma^2 \quad (1)$$

where $\mu$ denotes the mean exit time of the adsorption front and $\sigma$ denotes the temporal width of the adsorption front.

To obtain a breakthrough curve it is appropriate to choose particular temperature, pressure and nitrogen concentration conditions in order that the equation (1) should be obeyed, this being with a view to a simple evaluation of the parameter $a_k$: more precisely, a starting mixture of nitrogen and oxygen will be chosen including less than 10% by volume of nitrogen. In addition the pressure within the adsorption zone will be fixed at a value lower than $2 \times 10^5$ Pa, while verifying that the latter belongs to the region of linearity of the curve representing the variation of the adsorptivity as a function of pressure. These conditions are easily determined by a specialist.

The operating procedure followed in plotting the breakthrough curve is, for example, the following:

A mixture of nitrogen and oxygen is injected, (at constant flow rate) at one of the ends of the adsorption zone initially in equilibrium with pure oxygen. In a first step all of the nitrogen present in the mixture is adsorbed on the adsorbent, pure oxygen being recovered at the exit of the adsorption zone. In the adsorption zone the adsorbent situated at the zone entry is the first to trap the nitrogen molecules from the $O_2/N_2$ mixture. During this same time the adsorbent in proximity to the exit of the adsorption zone, being solely in contact with an oxygen flow, remains intact. The borderline between the still active adsorbent situated on the exit side of the adsorption zone and the inactivated adsorbent (due to the adsorption of nitrogen molecules) located on the entry side of the adsorption zone is commonly referred to by the name of adsorption front. The latter, once formed, gradually moves forward along the adsorption zone owing to adsorption of the nitrogen molecules from the mixture to be separated.

It will be understood that once the adsorption front reaches the end of the adsorption zone the gas recovered at the exit of the zone contains nitrogen in addition to the expected oxygen, insofar as all of the adsorbent bed present in the adsorption zone is saturated.

Because of the complexity of the molecular diffusion mechanisms and of the heterogeneity of the zeolite agglomerates, the saturation of the adsorbent does not take place uniformly in the direction of progress of the gas mixture within the adsorption zone. Thus, when it reaches the end of the adsorption zone, the nitrogen concentration in the mixture recovered at the exit increases gradually.

The breakthrough curve represents the variation in the oxygen concentration at the exit of the adsorption zone as a function of time, the time 0 corresponding to the precise moment when the adsorption stage is initiated. This curve is defined by the equation c=f(t) where c denotes the oxygen concentration in the gas mixture recovered at the exit, t is the time variable and f is the function representing the variations in the concentration c as a function of the time t.

In order to determine the parameter ak the breakthrough curve needs to be recorded. This is done in a way which is known per se, merely by measuring the oxygen concentration in the gas mixture recovered at the exit of the adsorption zone at various times.

The mean exit time $\mu$ of the front is calculated from the breakthrough curve f(t) according to the following equation (a):

$$\mu = \frac{\int_o^\infty t \times f'(t) \times dt}{\int_o^\infty f'(t) \times dt} \quad (a)$$

where f'(t) denotes the derivative of the function f(t) defined above.

Similarly, the temporal width of the front corresponds to the following equation (b):

$$\sigma^2 = \frac{\int_o^\infty (t-\mu)^2 \times f'(t) \times dt}{\int_o^\infty f'(t) \times dt} \quad (b)$$

where f' (t) also corresponds to the derivative of the function f(t).

The parameter $a_k$ is then defined by the following equation (c):

$$a_k = 2 \times \mu / \sigma^2 \quad (c)$$

and is thus easily determined from the values of $\mu$ and $\sigma$ calculated in this way.

When, in addition to the conditions (i), (ii) and (iii), the second adsorbent obeys the condition (iv): $ak_2 \geq ak_1$ stated above, the process of the invention makes it possible to arrive at the best compromise between the cost and the output performance.

Among the adsorbents corresponding to these four conditions (i), (ii), (iii) and (iv), those in the case of which $ak_2$ satisfies the following equation (v) form a preferred group of adsorbents:

$$ak_2/ak_1 \geq C_1/C_2 \quad (v)$$

where $C_1$, $C_2$, $ak_1$ and $ak_2$ are as defined above. In this case, in fact, the process of the invention permits an improvement in the performance, especially in terms of output efficiency and of yield, when compared with an equivalent process employing as sole adsorbent a bed consisting of a lithium-exchanged zeolite.

In the adsorption zone the first and second adsorbents are arranged so that the gas mixture to be separated passes through them one after the other. The order in which the contact of the gas mixture with the first and second adsorbents takes place is not essential to ensure that the separation is successful. Nevertheless, it has been found that the efficiency of the separation can be optimized by placing the first adsorbent (exchanged with lithium) at the entry of the adsorption zone and the second adsorbent (exchanged with one or more divalent cations) at the exit of the adsorption zone. The mixture containing oxygen and nitrogen to be separated thus comes first of all into contact with the first adsorbent and then subsequently in contact with the second adsorbent.

Certain values of the mass percentage of the first adsorbent, exchanged with lithium, calculated in relation to the total mass of adsorbent are particularly advantageous.

Even though the preferred range of variation of the mass percentage of the first adsorbent cannot be determined beforehand, insofar as it depends on the ratio of the absorptivities, of the selectivities and of the parameters ak of the two adsorbents employed, an optimum performance has been observed with a proportion of lithium zeolite of between 40 and 90%, preferably between 50 and 80% relative to the total quantity by volume of the first and second adsorbents.

The determination of the preferred range of variation of this mass percentage is easy and will be carried out experimentally by a person skilled in the art, or using modelling by studying the variations in the performance of the process at given values of the volume ratio of the first and second adsorbents. This is, furthermore, illustrated later in the examples.

In the case where the second adsorbent is such that its parameter $ak_2$ obeys the equation (v) below:

$$ak_2/ak_1 \geq C_1/C_2 \qquad (v)$$

the proportion of the second adsorbent to be employed as a mixture with the first adsorbent can be determined so as to obtain a maximum yield and/or a maximum output efficiency.

It will be noted that the maximum yield and output efficiency attained are higher than the yield and output efficiency obtained when employing an adsorbent bed consisting exclusively of faujasite exchanged to at least 80% with lithium. Accordingly, the invention strongly challenges this prejudice of the state of the art, according to which the performance of a process of separation of gas mixtures containing nitrogen and oxygen are maximized when the adsorbent employed consists solely and entirely of a lithium-exchanged zeolite which has a high adsorptivity.

A person skilled in the art who specializes in zeolites will easily determine the experimental conditions for preparing zeolites operating as first and second adsorbents so as to satisfy each of the above conditions (ii), (iii), (iv) and (v), especially by modifying the porosity of the adsorbents or the particle size of the zeolite agglomerates employed.

It will be noted that with decreasing values of the particle size of agglomerated zeolites the kinetic parameter ak characterizing the adsorbent increases. Moreover, it is possible to employ zeolites in the form of crystalline powders or of agglomerates, the agglomerates being obtained conventionally by making use of conventional agglomeration processes.

The agglomerated zeolite can, for example, be prepared by mixing a crystalline zeolite powder with water and a binder (generally in powder form), followed by spraying this mixture onto zeolite agglomerates acting as agglomeration seed. During the spraying the zeolite agglomerates are subjected to a continuous rotation about themselves. This can be done by placing the agglomerates in a reactor in rotation about itself around an axis inclined in relation to the vertical direction. Using this process, commonly referred to in the art as a "snowball" process, agglomerates are obtained in the form of small balls.

The agglomerates thus obtained are next subjected to roasting at a temperature of between approximately 500 and 700° C., preferably close to 600° C.

As examples of a binder, a person skilled in the art will be able to resort to a clay, such as kaolin or attapulgite, to silica or to alumina.

The agglomerated zeolite thus obtained, which includes a binder, can be used for the preparation of binder-free agglomerated zeolite which can also be employed in the process of the invention. In order to convert the binder into zeolitic phase it is possible, in fact, to perform a subsequent treatment of the zeolitic agglomerates with a binder, whereby, after conversion of the binder, binder-free zeolitic agglomerates are obtained.

The exchange ratio characterizing the second adsorbent is another of the parameters which a person skilled in the art may adjust so that the above conditions (ii) to (v) are actually fulfilled.

In fact, the nitrogen adsorptivity varies as a function of the $Ca^{2+}$ cation content of the zeolite. Consequently the nitrogen adsorption kinetics of the zeolite are themselves also a function of the overall calcium ion content. The parameter $ak_2$ is thus directly dependent on the calcium ion content.

The following experimental procedure can be employed for the preparation of the second adsorbent from the corresponding unexchanged zeolite: a 1N aqueous solution of one or more salts of divalent cations, such as calcium chloride, is added with stirring to a reactor charged with unexchanged zeolite. The whole reaction mixture is brought to a temperature of between 40 and 80° C. The exchange ratio is adjusted by regulating the quantity of divalent cations brought into contact with the zeolitic solid phase, it being understood that, to introduce a given quantity of cations, it suffices to add to the reactor a calculable proportion of this quantity of calcium ions. The zeolite is recovered by simple filtration of the reaction mixture, optionally followed by a wash.

Such exchanged zeolites are furthermore generally available commercially.

A person skilled in the art thus has a number of parameters available enabling him or her to have easy access to the development of the second adsorbent, these various parameters having to be controlled during the manufacturing procedure in a manner which is known per se.

According to a particular embodiment of the invention the first and second adsorbents will be obtained from the same parent zeolite by ion exchange. Accordingly, a first batch of the parent zeolite will be treated with an aqueous solution of lithium salts so as to isolate the faujasite exchanged to at least 80% with lithium and a second batch of the parent zeolite with an aqueous solution of one or more salts of divalent cations, so as to isolate the zeolite exchanged with divalent cations and employed as second adsorbent.

In this way the first and second adsorbents exhibit the same porosity, the same particle size and the same proportion of binder, and differ mainly according to their nitrogen adsorptivity, their adsorption selectivity for nitrogen in relation to oxygen and their ak parameter.

Before the first and second adsorbents are employed, they must be activated, the activation of a zeolite being its dehydration, that is to say the removal of the water of hydration which it contains. Many processes for activating zeolites are known in the art. One of them consists in subjecting the zeolite to a pressure of $0.1 \times 10^4$ Pa to $1 \times 10^6$ Pa while passing a stream of an inert gas (such as nitrogen) through the bed of zeolite and while heating to a temperature of between 300 and 650° C. at a rate of temperature rise of 0.1 to 40° C./min. The zeolite can also be activated either by being kept under a vacuum of approximately $1\times10^4$ Pa while being heated to a temperature of 300 to 650° C. (without purging with an inert gas), or by employing microwaves, as described in U.S. Pat. No. 4,322,394.

In order to produce oxygen continuously it is known to arrange in parallel a certain number of beds of adsorbent which are subjected alternately to a cycle of high-pressure adsorption and to desorption by lowering the pressure.

Such plants are used especially in the PSA or VSA processes. The treatment cycle to which each adsorbent bed is subjected includes stage which consist in:

a) passing a gaseous effluent consisting of a mixture containing nitrogen and oxygen in an adsorption zone including, in any order, a first bed of adsorbent consisting of a first selective adsorbent for nitrogen, the first adsorbent being a zeolite of faujasite type exchanged to at least 80% with lithium, in which the Si/Al ratio is lower than 1.5, and a second bed of adsorbent consisting of a second selective adsorbent for nitrogen, the second adsorbent being an exchanged zeolite including divalent cations chosen from the group consisting of alkaline-earth metal cations and of transition metal cations, the said second adsorbent being additionally characterized by:

a nitrogen adsorptivity $C_2$ lower than the nitrogen adsorptivity $C_1$ characterizing the first adsorbent; and an adsorption selectivity for nitrogen in relation to oxygen at $1\times10^5$ Pa and at 20° C. higher than 3;

and recovering oxygen or a gas mixture enriched in oxygen;

b) desorbing the nitrogen adsorbed in each of the first and second beds of adsorbents by lowering the partial pressure of nitrogen within the adsorption zone;

c) raising the pressure of the adsorption zone again by introducing a stream of oxygen or air.

Each adsorbent bed thus passes cyclically through a stage a) of producing oxygen at high pressure, a stage b) of decompression and a stage c) of recompression.

According to a preferred alternative embodiment the nitrogen is removed in stage b) via the entry of the adsorption zone.

Furthermore, when a flow of oxygen is employed for the recompression of the adsorption zone, it is introduced countercurrentwise, that is to say through the exit of the adsorption zone. On the other hand, when a flow of air is employed in this stage, it is introduced concurrently, that is to say through the entry of the adsorption zone.

During stage a) the adsorption zone is preferably fed with a mixture containing nitrogen and oxygen at a pressure of between $1\times10^5$ Pa and $1\times10^6$ Pa, and at a temperature of between −20 and +80° C.

Similarly, during stage b) it is particularly advantageous to keep the adsorption zone at a pressure of between $1\times10^4$ Pa and $1\times10^5$ Pa.

Furthermore, the operation of 1 to 3 beds of adsorbents (that is to say 1 to 3 adsorbers) arranged in parallel is commonplace in the technology.

In order to optimize the PSA or VSA processes it is advantageous to introduce stages of pseudoequilibrations of pressure.

BRIEF DESCRIPTION OF THE DRAWINGS

The invention will now be described with reference to the examples of embodiment and to the figures.

Figure 2:
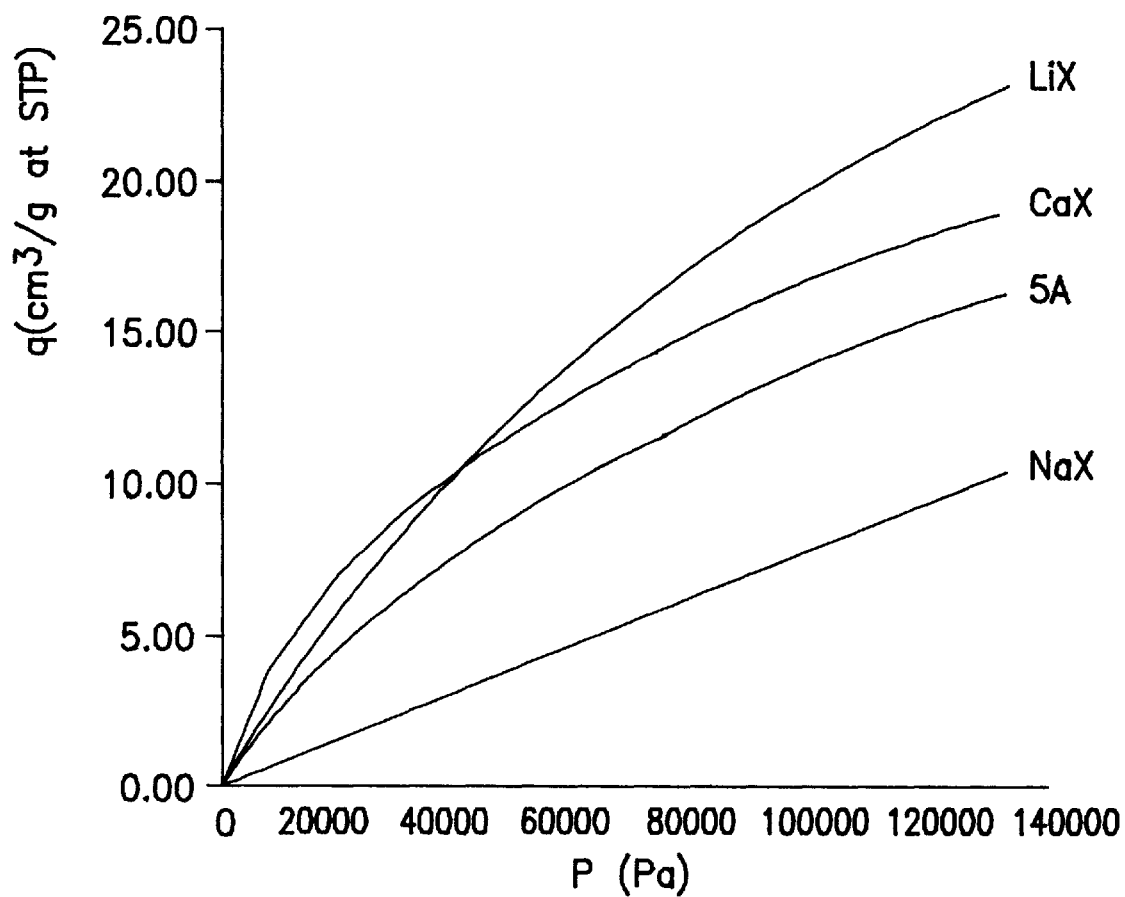

In the appended FIG. 2 are shown the isothermal curves of variation in the nitrogen adsorptivity of each of the zeolites studied in the Examples 1 to 5 below, as a function of the adsorption pressure.

DETAILED DESCRIPTION OF THE INVENTION

From FIG. 1 it clearly follows that each bed of adsorbent passes through 5 successive stages which can be described briefly as follows:

stage 1: in a first step the bed initially saturated with oxygen operates in adsorption, that is to say that a gas stream consisting of the mixture (containing oxygen and nitrogen) to be separated is passed continuously into the adsorption zone and that the practically pure gaseous oxygen (or an oxygen-enriched gas) is recovered at the exit of the adsorption zone. Throughout this stage the pressure within the adsorption zone is kept constant and equal to $1.1\times10^5$ Pa;

stage 2: before the nitrogen adsorption front has left the adsorption zone the production stage is interrupted, that is to say the adsorption zone is no longer fed with gas mixture to be separated. The adsorbent bed is then connected to that of the two other adsorbent beds entering the pseudoequilibration stage. Since the pressure prevailing within this second adsorption bed is lower than $1.1\times10^5$ Pa, the oxygen recovered at the exit of the first adsorbent bed therefore passes into the second adsorbent bed, and this contributes to lowering the pressure within the first adsorption zone;

stage 3: in the following stage the nitrogen adsorbed on the adsorbent is desorbed by gradual reduction of the pressure within the adsorption zone; to do this, the entry of the zone is connected to a vacuum pump. During this decompression stage the adsorption zone changes from $0.92\times10^5$ Pa to $0.26\times10^5$ Pa (the exit of the adsorption zone being kept hermetically closed);

stage 4: at the end of the decompression stage the adsorption zone enters a pseudoequilibration stage. In order to raise the pressure in the adsorption zone, the latter is connected to that of the two other adsorbent beds which, at the end of a production stage, enters stage 2. The oxygen produced and recovered at the exit of the second adsorbent bed thus contributes to increasing the pressure of the first adsorbent bed. However, this stage does not result in an equalizing of pressure within the two adsorbent beds, insofar as the oxygen stream originating from the second adsorbent bed is introduced countercurrentwise at the exit of the first adsorption zone and flows freely within the first adsorption zone before being discharged through the entry of the first adsorption zone;

stage 5: when the pressure of the adsorption zone reaches $0.32\times10^5$ Pa the recompression of the adsorbent bed is undertaken. To do this, the entry of the adsorption zone being kept hermetically closed, a flow of pure oxygen is introduced, countercurrentwise, through the entry of the adsorption zone until the desired pressure of $1.1\times10^5$ Pa is reached.

The isotherms in FIG. 2 correlate the variations in the nitrogen adsorptivity as a function of the adsorption pressure in the case:

of a zeolite 13X (faujasite) exchanged to 95% with lithium (reference LiX in the figure)

of this zeolite 13X exchanged to 70% with calcium (ref. CaX);

of a zeolite 5A exchanged to 70% with calcium (ref. 5A);

and of an unexchanged zeolite X (ref. NaX).

The precise references of the zeolites employed are given below in the description.

The faujasite exchanged to 95% with lithium is prepared in the following manner, starting with the faujasite 13X-APG marketed by the company UOP. A 1.94N aqueous solution of lithium chloride, the pH of which has been adjusted to 8 beforehand by adding lithium hydroxide, is percolated through a column packed with 1 kg of this faujasite, the column being maintained at 95° C.

On the curves of FIG. 2, the quantity q of nitrogen adsorbed (in $cm^3/g$ at STP) have been plotted as ordinates and the adsorption pressure (in Pa) as abscissae.

These curves were recorded at 20° C. by volumetric analysis by means of a Sorptomatic MS 190 instrument marketed by Fisons, after activation of the zeolites at 400° C. under vacuum for 8 h.

EXAMPLES

In the following Examples 1 to 5 a high output efficiency PSA cycle has been simulated on a computer, including 5 treatment stages applied in 3 separate adsorption zones operating in parallel.

The complete treatment cycle (illustrated in FIG. 1) lasts 90 s, namely 30 s of production (stage 1), 30 s for the combination of stages 2 and 3, and 30 s for the combination of stages 4 and 5.

The output efficiency corresponds to the volume of oxygen produced, measured in standard conditions of temperature and pressure, per mass or volume unit of adsorbent. A distinction is made between the hourly output efficiency, where the measured oxygen volume is the volume of oxygen produced every hour, and the output efficiency per cycle, where the measured oxygen volume is the volume of oxygen produced in the course of one PSA cycle (5 stages).

The yield is the ratio of the volume of oxygen produced during a given period of time, measured in standard conditions of temperature and pressure, to the volume of oxygen present in the initial mixture to be separated, measured in standard conditions of temperature and pressure.

The program employed for the simulation is based on the principles of mass conservation, of conservation of enthalpy and of conservation of momentum, and employs the Linear Driving Force model for the evaluation of the kinetics of the solid-gas transfers within the mass of adsorbent. Such simulation models are described especially in Pressure Swing Adsorption, Ruthven, Farooq and Knaebel, VCH Publishers, 1994, pages 172–209, and in Fluid Flow Through Packed Columns, S. Ergun, Chem. Eng. Progr., 48(2), 89(1952). The solution of the equations, for its part, can be carried out, for example, by means of the program DIVPAG from the IMSL Mathematical Library (International Mathematical & Statistical Library, marketed by the Microsoft © company) or of the program ADSIM marketed by the AspenTech © company.

A person skilled in the art is perfectly capable of choosing a suitable simulation program from the many programs available on the market and of introducing the above data therein. If need be, reference may also be made to the paper by D. G. Hartzog and S. Sircar, Adsorption, 1, 133–151 (1995), Sensitivity of PSA Process Performance to Input Variables, which describes a similar program.

In Examples 1 to 5 the gas mixture containing oxygen and nitrogen to be separated is air and the zeolites employed are generally available commercially.

More precisely:

the faujasite exchanged with lithium (employed as first adsorbent; 13X-Li or LiX hereinafter) is obtained, as explained above, from a zeolite of 13X type (faujasite), marketed by the company UOP under reference 13X-APG, which is subjected to an exchange with lithium ions (exchange to 95%);

zeolite 13X exchanged with calcium (employed as second adsorbent; 13X-Ca or CaX hereinafter) is also obtained from zeolite 13X-APG, which is subjected to an exchange with $Ca^{2+}$ cations (exchange to 70%);

zeolite 5A exchanged with calcium (employed as second adsorbent; 5A-Ca or 5A hereinafter) is obtained from a zeolite of 5A type marketed by Bayer under reference KEG-407, which is subjected to an exchange with $Ca^{2+}$ cations (exchange to 70%).

The nitrogen and oxygen adsorptivities (at 20° C. and $10^5$ Pa) and the selectivities of these various adsorbents are given in the following table:

| Adsorbent | 13X-Li | 13X-Ca | 5A-Ca |
| --- | --- | --- | --- |
| $N_2$ adsorptivity | 19.86 | 16.78 | 14.02 |
| $O_2$ adsorptivity | 3.6 | 4.42 | 4.06 |
| Selectivity | 5.50 | 3.79 | 3.46 |

The nitrogen and oxygen adsorptivities are expressed in $cm^3/g$ at STP.

Example 1

Figure 1:
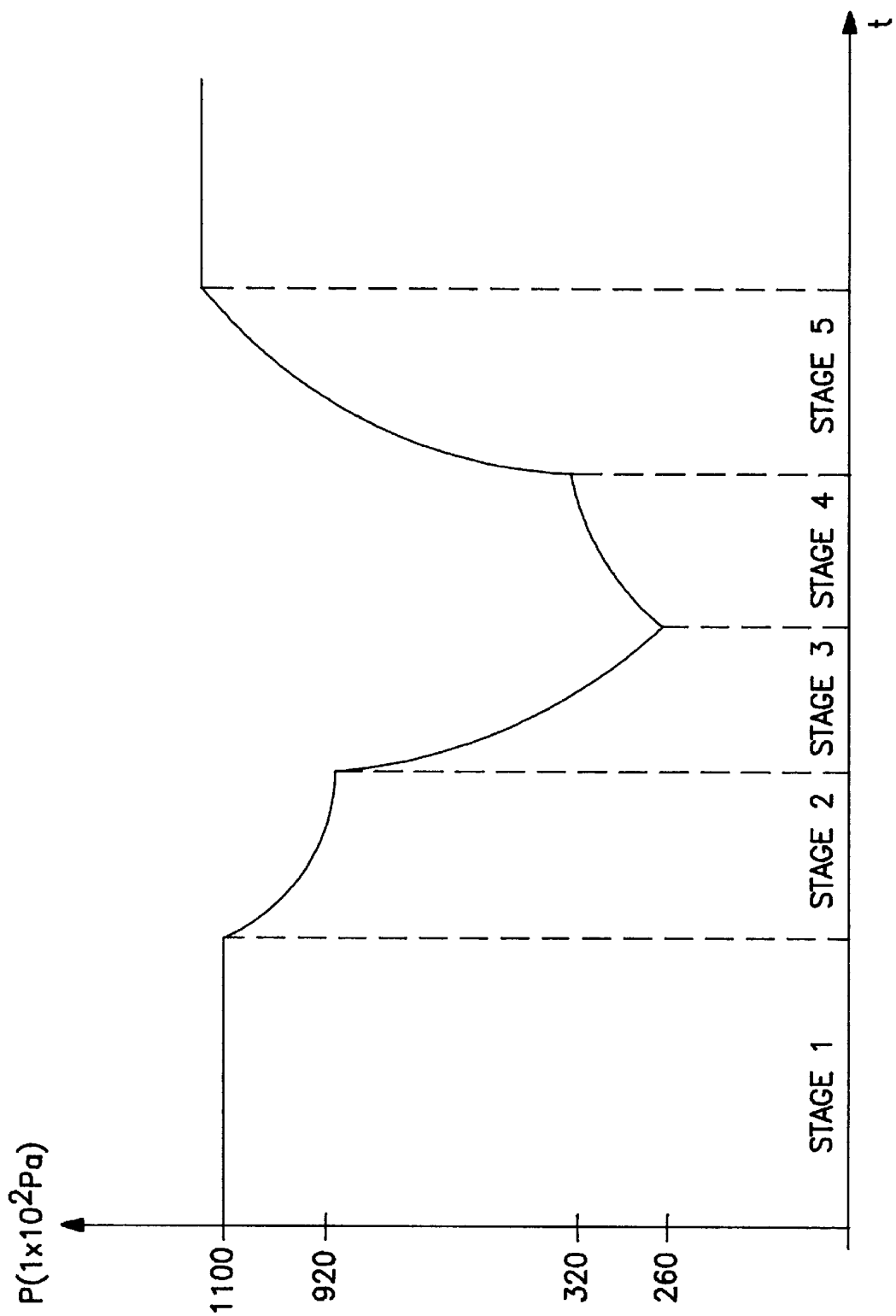
FIG. 1 shows the change in pressure within an adsorption zone in the course of a cycle of purification treatment of a gas mixture containing oxygen and nitrogen by a PSA process employing a plant with three beds of adsorbent (three adsorbers in parallel).

In this example a study has been made of the influence of the proportion (in volume %) of faujasite exchanged with lithium (13X-Li) in comparison with that of zeolite 5A exchanged with calcium (5A-Ca) on the output efficiency and the yield of the PSA cycle of FIG. 1.

To do this, the composition of the adsorbent bed has been varied between a 90/10% volume percentage ratio (13X-Li/5A-Ca) and a 50/50% volume ratio (cf. Compositions 1a to 1e).

In other words, the volume ratio of the first bed of adsorbent of lithium faujasite type (zeolite 13X exchanged to 95% with lithium) to the second bed of adsorbent of zeolite 5A-Ca type (zeolite 5A exchanged to 70% with calcium), forming the second adsorbent bed, was varied.

Furthermore, the two zeolites 13X-Li and 5A-Ca are such that the ratio of the respective ak parameters is 1.5 ($ak_2/ak_1=1.5$).

Table 1 below collates the values of hourly output efficiency and of yield found in each case (Compositions 1a to 1e).

TABLE 1

| Compositions | 1a | 1b | 1c | 1d | 1e |
| --- | --- | --- | --- | --- | --- |
| % 13X-Li | 90 | 80 | 70 | 60 | 50 |
| % 5A-Ca | 10 | 20 | 30 | 40 | 50 |
| Yield | 62.74 | 63.17 | 62.58 | 61.87 | 61.05 |
| Output efficiency ($m^3\ h^{-1}\ m^{-3}$ of adsorbent, at STP) | 36.25 | 36.09 | 35.05 | 33.93 | 32.76 |

The oxygen produced is 93% pure.

The results listed in the above Table 1 show that in this case ($ak_2/ak_1=1.5$) output efficiency and yield optima exist in the case of a (13X-Li/5A-Ca) volume ratio of between 90/10% and 80/20%.

Example 2

In this example the operating procedure is the same as in Example 1, except that, in this case, the ratio of the kinetic parameters is 2 ($ak_2/ak_1=2$) and that the composition of the adsorbent bed varies between a 100/0% (13X-Li/5A-Ca) volume percentage ratio and a 50/50% volume ratio (Compositions 2a to 2f).

The results obtained appear in Table 2 below.

TABLE 2

| Compositions | 2a | 2b | 2c | 2d | 2e | 2f |
|---|---|---|---|---|---|---|
| % 13X-Li | 100 | 90 | 80 | 70 | 60 | 50 |
| % 5A-Ca | 0 | 10 | 20 | 30 | 40 | 50 |
| Yield | 60.36 | 59.25 | 61.66 | 61.77 | 61.30 | 60.58 |
| Output efficiency ($m^3\ h^{-1}\ m^{-3}$ of adsorbent, at STP) | 33.72 | 33.51 | 34.87 | 34.33 | 33.41 | 32.35 |

The oxygen produced is 93% pure.

The results listed in the above Table 2 show that, in this case ($ak_2/ak_1=2$), hourly output efficiency and yield optima exist at a volume ratio of between 80/20% and 70/30% (13X-Li/5A-Ca), which yield and output efficiency are, furthermore, higher than those obtained with an adsorbent consisting solely of lithium zeolite (Composition 2a).

Example 3

In this example the operating procedure is the same as in Example 1, except that, in this case, the ratio of the kinetic parameters is 3 ($ak_2/ak_1=3$) and that the composition of the adsorbent bed varies between a 100/0% (13X-Li/5A-Ca) volume percentage ratio and a 0/100% volume ratio (Compositions 3a to 3g).

The results summarized in Table 3 below were obtained.

TABLE 3

| Compositions | 3a | 3b | 3c | 3d | 3e | 3f | 3g |
|---|---|---|---|---|---|---|---|
| % 13X-Li | 100 | 90 | 80 | 70 | 60 | 50 | 0 |
| % 5A-Ca | 0 | 10 | 20 | 30 | 40 | 50 | 100 |
| Yield | 51.28 | 51.55 | 57.26 | 59.49 | 59.76 | 59.52 | 53.82 |
| Output efficiency ($m^3\ h^{-1}\ m^{-3}$ of adsorbent, at STP) | 26.87 | 27.51 | 31.42 | 32.45 | 32.11 | 31.44 | 25.34 |

The oxygen produced is 93% pure.

The results listed in the above Table 3 show that, in this case ($ak_2/ak_1=3$), hourly output efficiency and yield optima exist at a lithium faujasite/calcium zeolite volume ratio which is situated between the 70/30% and 60/40% ratios, which yield and output efficiency are clearly higher than those obtained with an adsorbent consisting solely of lithium zeolite (exchanged to 95%) and illustrated by Composition 3a (bed consisting of 100% of 13X-Li).

To summarize, the above examples show clearly that the optimum performances are not obtained in the case of a proportion of 100% of lithium zeolite, and that it is not only possible but also desirable to replace a portion of the adsorbent bed consisting of a zeolite exchanged with lithium (faujasite) with an equivalent quantity by weight of zeolite exchanged with a divalent cation such as calcium.

Example 4

In this example the operating procedure is the same as in Example 1, except that, in this case, the ratio of the kinetic parameters is 3 ($ak_2/ak_1=3$) and that the composition of the adsorbent bed varies as follows:

composition 4a: lithium faujasite/calcium zeolite 13X volume percentage ratio equal to 100/0% (13X-Li/13X-Ca);

and composition 4b: lithium faujasite/calcium zeolite 13X ratio equal to 60/40%.

The results summarized in Table 4 below were obtained.

TABLE 4

| Compositions | 4a | 4b |
|---|---|---|
| % 13X-Li | 100 | 60 |
| % 13X-Ca | 0 | 40 |
| Yield | 51.28 | 59.95 |
| Output efficiency ($m^3\ h^{-1}\ m^{-3}$ of adsorbent, at STP) | 26.87 | 32.59 |

The oxygen produced is 93% pure.

This Example 4 shows that when the bed of second adsorbent of zeolite 5A-Ca type is replaced with a bed of a second adsorbent of zeolite 13X-Ca type, then, as in Examples 1 to 3, performances (yield and hourly output efficiency) are obtained which are superior to those obtained with a bed consisting solely of an adsorbent of the lithium zeolite type (100/0% ratio of the Composition 4a).

Example 5

The operating conditions in this example are identical with those of the preceding example, except that the adsorbent bed is made up of:

composition 5a: faujasite exchanged to 95% with lithium (13X-Li); and composition 5b: first adsorbent of lithium faujasite type (13X-Li) and second adsorbent of unexchanged zeolite X type (X—Na), that is to say including only sodium cations in its crystal structure. The nitrogen and oxygen adsorptivities (20° C., $10^5$ Pa) of this unexchanged zeolite X are equal to 8.00 $cm^3$/g at STP and 2.50 $cm^3$/g at STP, respectively; its selectivity being equal to 3.20.

This comparative example corresponds, in fact, to a case similar to that described by the abovementioned U.S. Pat. No. 5,203,887, which illustrates the prior art, namely a first adsorbent bed consisting of a zeolite exchanged with lithium and a second bed consisting of an unexchanged zeolite.

The characteristics of the unexchanged zeolite Na (ref. X—Na or NaX) are the following:

its nitrogen adsorptivity is proportional to the adsorption pressure (linear isotherm);

its nitrogen adsorptivity at $1\times10^5$ Pa and at 20° C. is 8 $cm^3$/g at STP;

its adsorption selectivity for nitrogen in relation to oxygen at $1\times10^5$ Pa and at 20° C. is 3.2; and its kinetic coefficient $ak_2$ is identical with that of zeolite 5A in the adsorbent bed used in Examples 1 to 3.

More precisely, the $ak_2/ak_1$ ratio of the kinetic coefficients of the lithium zeolite to the unexchanged zeolite X—Na is 3.

The results obtained have been collated in Table 5 below.

TABLE 5

| Compositions | 5a | 5b |
|---|---|---|
| % 13X-Li | 100 | 60 |
| % X-Na | 0 | 40 |
| Yield | 51.28 | 54.6 |

TABLE 5-continued

| Compositions | 5a | 5b |
|---|---|---|
| Output efficiency ($m^3 h^{-1} m^{-3}$ of adsorbent, at STP) | 26.87 | 25.89 |

In this example the oxygen obtained is 93% pure.

The comparison of this Example 5 with the preceding examples proves the superiority of the combination of lithium faujasite/zeolite exchanged with a divalent cation (case of the present invention) over a combination of lithium zeolite/unexchanged zeolite (U.S. Pat. No. 5,203,887), since, in this latter case, the yield and hourly output efficiency drop by approximately 10% and 20% (relative percentages) respectively, in relation to the results obtained, for Example 4, by using the process of the invention.

We claim:

1. Process of separation of a gas mixture containing oxygen and nitrogen, including bringing the mixture to be separated into contact in an adsorption zone consisting of a first selective adsorbent for nitrogen and a second selective adsorbent for nitrogen, the first adsorbent being a zeolite of faujasite type exchanged to at least 80% with lithium, in which the Si/Al ratio is lower than 1.5, the second adsorbent being a zeolite exchanged with divalent cations selected from the group consisting of alkaline-earth metal cations and transition metal cations, the second adsorbent having:

a nitrogen adsorptivity $C_2$ lower than a nitrogen adsorptivity $C_1$ of the first adsorbent;

an adsorption selectivity for nitrogen in relation to oxygen at $1 \times 10^5$ Pa and at 20° C. higher than or equal to 3; and a parameter $ak_2$ which obeys the following equation (iv):

$$ak_2 > ak_1 \quad (iv),$$

the parameters $ak_1$ and $ak_2$ characterizing the kinetics of nitrogen adsorption on the first and second adsorbents respectively in accordance with the Linear Driving Force model.

2. The process according to claim 1, wherein the parameter $ak_2$ of the second adsorbent obeys the following equation:

$$ak_2 \geq 2xak_1.$$

3. The process according to claim 2, wherein the parameter $ak_2$ of the second adsorbent obeys the following equation:

$$ak_2 \geq 3xak_1.$$

4. The process according to claim 1, wherein the second adsorbent has a parameter $ak_2$ which obeys the following equation (v):

$$ak_2/ak_1 \geq C_1/C_2 \quad (v),$$

the parameters $ak_1$ and $ak_2$ characterizing the kinetics of nitrogen adsorption on the first and second adsorbents respectively in accordance with the Linear Driving Force model.

5. The process according to claim 1, wherein the mixture containing nitrogen and oxygen is air.

6. The process according to claim 1, wherein oxygen or a gas mixture enriched in oxygen is recovered.

7. The process according to claim 1, wherein the nitrogen adsorptivity of the second adsorbent, at $1 \times 10^5$ Pa and at 20° C., is higher than or equal to 12 $g/cm^3$.

8. The process according to claim 7, wherein the nitrogen adsorptivity of the second adsorbent, at $1 \times 10^5$ Pa and at 20° C., is higher than or equal to 14 $g/cm^3$.

9. The process according to claim 1, wherein the adsorption selectivity for nitrogen in relation to oxygen of the second adsorbent at $1 \times 10^5$ Pa and at 20° C. is higher than 3.2.

10. The process according to claim 1, wherein the zeolite exchanged with divalent cations and transition metal cations includes $Na^+$ ions and the divalent cations are selected from the group consisting of $Ca^{+2}$, $Mg^{+2}$, $Ba^{+2}$ and $Sr^{+2}$.

11. The process according to claim 1, wherein the zeolite exchanged with divalent cations and transition metal cations is a zeolite 10X exchanged with calcium or a zeolite 5A exchanged with calcium.

12. The process according to claim 1, wherein the percentage of the first adsorbent in relation to the total quantity of the first and second adsorbents is between 40 and 90%.

13. The process according to claim 12, wherein the percentage of the first adsorbent in relation to the total quantity of the first and second adsorbents is between 50 and 80%.

14. The process according to claim 1, wherein the zeolite of faujasite type is exchanged to at least 86% with lithium.

15. The process according to claim 14, wherein the zeolite of faujasite type is exchanged to at least 90% with lithium.

16. The process according to claim 1, wherein the mixture containing oxygen and nitrogen to be separated is successively brought into contact with the first adsorbent and then with the second adsorbent.

17. Process of separation of a gas mixture containing oxygen and nitrogen, the process comprising the use of a treatment cycle including stages consisting in:

a) passing the gas mixture containing nitrogen and oxygen in an adsorption zone consisting of a first bed of adsorbent consisting of a first selective adsorbent for nitrogen and a second bed of adsorbent consisting of a second selective adsorbent for nitrogen, the first adsorbent being a zeolite of faujasite type exchanged to at least 80% with lithium, in which the Si/Al ratio is lower than 1.5, the second adsorbent being an exchanged zeolite including divalent cations selected from the group consisting of alkaline-earth metal cations and of transition metal cations, the second adsorbent having:

a nitrogen adsorptivity $C_2$ lower than a nitrogen adsorptivity $C_1$ of the first adsorbent;

an adsorption selectivity for nitrogen in relation to oxygen at $1 \times 10^5$ Pa and at 20° C. higher than 3; and a parameter $ak_2$ which obeys the following equation (iv):

$$ak_2 > ak_1 \quad (iv),$$

the parameters $ak_1$ and $ak_2$ characterizing the kinetics of nitrogen adsorption on the first and second adsorbents respectively in accordance with the Linear Driving Force model; and recovering oxygen or a gas mixture enriched in oxygen;

b) desorbing the nitrogen adsorbed in each of the first and second beds of adsorbents by lowering the partial pressure of nitrogen within the adsorption zone; and c) raising the pressure of the adsorption zone again by introducing a stream of oxygen or air.

18. The process according to claim 17, wherein during stage a) the adsorption zone is fed with a gas mixture containing nitrogen and oxygen at a pressure between $1\times10^5$ Pa and $1\times10^6$ Pa and at a temperature between $-20$ and $+80°$ C.

19. The process according to claim 17, wherein in stage b) the oxygen pressure within the adsorption zone is between $1\times10^4$ Pa and $1\times10^5$ Pa.

20. The process according to claim 17, wherein in stage c) the oxygen flow is introduced countercurrently.

21. The process according to claim 17, wherein in stage c) the air stream is introduced concurrently.

* * * * *